(12) United States Patent
McClinsey, Jr.

(10) Patent No.: US 10,098,397 B2
(45) Date of Patent: Oct. 16, 2018

(54) MASK KIT

(71) Applicant: James Matthew McClinsey, Jr., Middletown, NY (US)

(72) Inventor: James Matthew McClinsey, Jr., Middletown, NY (US)

( * ) Notice: Subject to any disclaimer, the term of this patent is extended or adjusted under 35 U.S.C. 154(b) by 352 days.

(21) Appl. No.: 14/989,772

(22) Filed: Jan. 6, 2016

(65) Prior Publication Data
US 2017/0013900 A1     Jan. 19, 2017

Related U.S. Application Data

(60) Provisional application No. 62/191,891, filed on Jul. 13, 2015.

(51) Int. Cl.
  *A41G 7/00*     (2006.01)
  *G09B 19/00*   (2006.01)

(52) U.S. Cl.
  CPC ............... *A41G 7/00* (2013.01); *G09B 19/00* (2013.01)

(58) Field of Classification Search
  None
  See application file for complete search history.

(56) References Cited

U.S. PATENT DOCUMENTS

| | | | | |
|---|---|---|---|---|
| 2,124,767 A | * | 7/1938 | Dawn | A41G 7/00 106/156.5 |
| 2,262,992 A | * | 11/1941 | Dessart | A41G 7/00 2/206 |
| 2,262,993 A | * | 11/1941 | Dessart | A41G 7/00 2/206 |
| 2,353,025 A | * | 7/1944 | Gautreaux | A45D 44/12 2/174 |
| 3,783,553 A | * | 1/1974 | Goozner | A63H 3/365 206/579 |
| 3,863,386 A | * | 2/1975 | Kinberg | A63H 3/36 434/410 |
| 4,397,701 A | * | 8/1983 | Johnson | A41G 7/00 156/247 |
| 4,828,116 A | * | 5/1989 | Garcia | B44C 3/042 206/575 |
| 4,941,212 A | * | 7/1990 | Liff | A41G 7/00 2/206 |
| D343,023 S | * | 1/1994 | Kilpatrick | D2/865 |
| 5,280,305 A | * | 1/1994 | Monroe | A41G 7/00 347/129 |
| 5,906,005 A | * | 5/1999 | Niskala | G03C 5/04 2/173 |
| 6,109,921 A | * | 8/2000 | Yau | G09B 19/00 132/319 |
| 6,832,392 B2 | * | 12/2004 | Palmer | A41G 7/00 2/206 |

(Continued)

*Primary Examiner* — James Hull
(74) *Attorney, Agent, or Firm* — Michael E. Zall

(57) ABSTRACT

A kit that contains a substantially blank mask, a mannequin head-form in the shape of a human head, at least one marker for applying a removable ink indicia to such blank mask, and preferably a set of instructions and forms to enhance the use of the mask. The blank mask is a continuous, stretchable and elastically resilient washable see-through mesh fabric that conforms to the head when worn by the user. The mask is placed over the head-form, a character drawn on the mask, and after use the mask can be washed and reused.

6 Claims, 6 Drawing Sheets

(56) References Cited

U.S. PATENT DOCUMENTS

| | | | |
|---|---|---|---|
| 8,162,712 B1* | 4/2012 | Uy | A63H 3/02 446/321 |
| 8,226,413 B2* | 7/2012 | Yip | A45D 44/14 434/94 |
| 9,161,606 B1* | 10/2015 | Wong | A45D 44/002 |
| 9,504,925 B2* | 11/2016 | Lauer | A63H 3/365 |
| 2003/0236050 A1* | 12/2003 | Landry | A63H 3/02 446/369 |
| 2004/0077274 A1* | 4/2004 | Becker | A63H 3/365 446/268 |
| 2006/0212996 A1* | 9/2006 | McGrath | A41D 13/1161 2/207 |
| 2015/0057574 A1* | 2/2015 | Baym | A61B 10/00 600/570 |

* cited by examiner

MASK KIT

RELATED APPLICATIONS

This application claims the benefit of U.S. Provisional Application 62/191,891 filed on Jul. 13, 2015 entitled My Hero, the Original Superhero Kit in a Box with an Educational Twist, the entire disclosure of which is incorporated herein by reference.

FIELD OF THE INVENTION

This invention relates to a formfitting reusable mask and kit therefore that can be selectively changed to different persona or characters, e.g., Super Heros, and that provides substantially clear vision or relatively unobstructed vision through the mask when worn by the user. This invention also relates to a method for making a mask, especially suitable for use by children and young adults, and a kit in which the required materials are arranged together in a ready-to-use form.

BACKGROUND OF THE INVENTION

Facial masks depicting characters are very popular for amusement purposes, especially around certain celebrations, such as Halloween, Mardi Gras, Chinese New Year, and private events, like birthday parties, bachelor parties, political campaigns, sports competitions, etc. Many children wear costumes and even partial costumes to play "make believe" and to emulate superhero characters. Typically, the mask and/or hood function to disguise the user and, with children, of also allowing the child to emulate the superhero character. Such superhero characters have, traditionally, tried to disguise their true persona or identity when not in their costume and that can only be done if the superhero wears a mask or concealing hood when performing their super deeds.

Typically, a mask is dedicated to one character, e.g., a superhero, and after interest wanes in such character the mask is not useful or fun to the user. Thus, it is desirable to have a light weight face covering mask that can be selectively changed to emulate different characters or superheroes.

Additionally, known masks require fairly large openings in the eye area to allow visibility. When the mask depicts a particular character, these openings have a defacing effect, as the eyes are the most defining facial feature of any character's identity. Reducing the size of the openings to enhance appearance only decreases visibility, resulting in a serious safety issue. Additionally, most masks create a tunnel vision effect that offer, at best, only minimal peripheral vision. Thus, it is desirable to have a light weight face covering mask that provides enhanced vision, particularly peripheral vision through the mask.

The following US patent references may be relevant to this invention:

US 2015/0143604 to Mizrahi discloses a costume that includes a T-shirt, a cape, hood and a mask components wherein the components are secured to each other yet selectively detachable.

U.S. Pat. No. 8,926,391 to Rodriguez discloses a mask that is printed on a flexible substrate material with facial features. Clear areas are provided that do not have any printing thereon to permit the user to see through the substrate.

U.S. Pat. No. 7,654,575 to Haag discloses a personalized book that includes a list of interview information to be obtained from a child.

U.S. Pat. No. 6,654,967 to Haar discloses a therapy apparel to assist in therapy sessions with children diagnosed with sensory integration dysfunction and impaired motor development. The apparel includes a top, trunks, a cape and a close-fitting headgear. The headgear has padded sides and a chin strap. A series of individual accouterments can be placed on the headgear at the discretion of the child.

U.S. Pat. No. 6,558,221 to Yang discloses a doll face wherein the head is a blank featureless face surface formed of a washable material. A stencil mask is provided with apertures. A number of stamps are provided, each stamp corresponding to an aperture shape in the stencil mask that may be passed through the apertures to imprint a design upon the face of the doll.

U.S. Pat. No. 6,109,921 to Yau discloses a soft skin make-up mannequin head having a smooth, realistic surface and texture simulative of human skin. The mannequin head is accompanied by flexible, soft-skin companion mask carrying a facial configuration identical with the mannequin head. The companion mask is stretchable and elastically resilient and mountable tightly upon said make-up mannequin head and selectively removable therefrom. The make-up mannequin head and associated companion mask is intended for the teaching, training and practice of application of permanent make-up using tattoo techniques.

U.S. Pat. No. 6,041,436 to Keen discloses a versatile costume system is provided including a body suit with fasteners mounted thereon and a plurality of unique masks each adapted to be worn by a user. Resilient decorative plates are provided that are equipped with fasteners that are adapted to be removably attached to those of the body suit, each of the decorative plates matching one of the masks.

U.S. Pat. No. 4,957,124 to Mooney discloses a cosmetic template initially created by the beautician to provide a cosmetic guideline to be followed by the user to achieve the desired shading and location thereof. A formable sheet of plastic is placed onto a person's face in a heated condition and forced against the face to assume the face shape. Small circles are marked onto the formed sheet to define the various facial contour features. The sheet is then removed from the face and openings are created in the sheet along the contour lines. The sheet has an elastic band for remounting the sheet to the person's face. A marker is extended through the various openings against the face marking the contour lines created in the template onto the face.

U.S. Pat. No. 4,397,701 to Johnson discloses a method of making a mask which comprises molding a sculptable material, affixing the molded material to a facial form to the desired contours of the mask, applying wetted strips of plaster-impregnated gauze to the molded material, drying the wetted gauze to form a completed mask and removing the form from the mask. The finished mask may be coated with a white glue and decorated.

U.S. Pat. No. 2,353,025 to Gautreaux discloses a dressing mask of net material including a plurality of shaped pieces of material, including a single piece cut and shaped to fit the forehead and over the nose and additional pieces shaped to fit the neck line and chin, and a piece of opaque fabric material attached to the net material to cover the lips.

OBJECTS AND SUMMARY OF THE INVENTION

It is an object of the present invention to provide an improved mask, and method of making such mask, which is reusable, form fitting, capable of changing characters depicted by the mask, provides enhanced visibility and that is particularly suited for use by young children.

It is a further object of this invention to provide a mask that covers the entire face of the user and yet provides relatively unobstructed or substantially clear visibility therethrough.

It is another object of this invention to produce a mask which permits the selective depiction of any real or fictional, animated or unanimated, specific or abstract characters.

It is a further object of this invention to provide a mask having enhanced frontal and peripheral visibility.

It is a further object of this invention to provide customized masks and methods of making such masks.

It is a further object of this invention to provide a mask having visibility therethrough and yet the mask covers the eyes of the user.

Accordingly, it is an object of the present invention to provide a new and improved method of making a mask requiring no special skills and one that may be easily mastered by children.

A further object of the present invention is to provide a kit containing the essential materials used in this method of making a mask.

Broadly, this invention is directed to a method of creating a mask having a character's face thereon that can be worn on a head of a user. The method comprises:

a. Providing a substantially blank mask that is a continuous, stretchable and elastically resilient washable see-through mesh fabric that conforms to the head when worn by the user;

b. Providing a mannequin head-form in the shape of a human head, wherein the blank mask is mountable tightly upon the head-form and selectively removable therefrom;

c. Providing at least one marker for applying removable ink indicia to such blank mask which can be removed from the mask by dissolution in water;

d. Mounting the blank mask on the head-form to provide a head-form having the mask tightly thereon;

e. Drawing a character's face on such blank mask with the at least the one marker;

f. Removing the mask with the characters face thereon from the head-form;

g. Placing the mask with the character's face thereon on the head of the user for use, and after such use;

h. Removing the mask with the character's face thereon from the head of the user;

i. Washing the mask with the character's face thereon to remove the ink indicia forming the character's face to form the substantially blank mask;

j. Repeating the steps a-i.

The present invention is also directed to a kit that contains the substantially blank mask, a mannequin head-form in the shape of a human head, at least one marker for applying removable ink indicia to such blank mask, and preferably a set of instructions and forms to enhance the use of the mask.

BRIEF DESCRIPTION OF THE DRAWINGS

Other features and advantages of the present invention will become apparent from the following more detailed description, taken in conjunction with the accompanying drawings, which illustrate, by way of example, the principles of the invention.

The drawings are not presented to scale but are only used to illustrate the principles of the invention. In the drawings, like reference numbers indicate like elements.

DETAILED DESCRIPTION OF THE INVENTION

A detailed description of one or more embodiments is provided below along with accompanying figures that illustrate the principles of the embodiments. The scope of the embodiments is limited only by the claims and encompasses numerous alternatives, modifications and equivalents. Numerous specific details are set forth in the following description. These details are provided solely for the purposes of example and the embodiments may be practiced according to the claims without some or all of these specific details.

Figure 1:
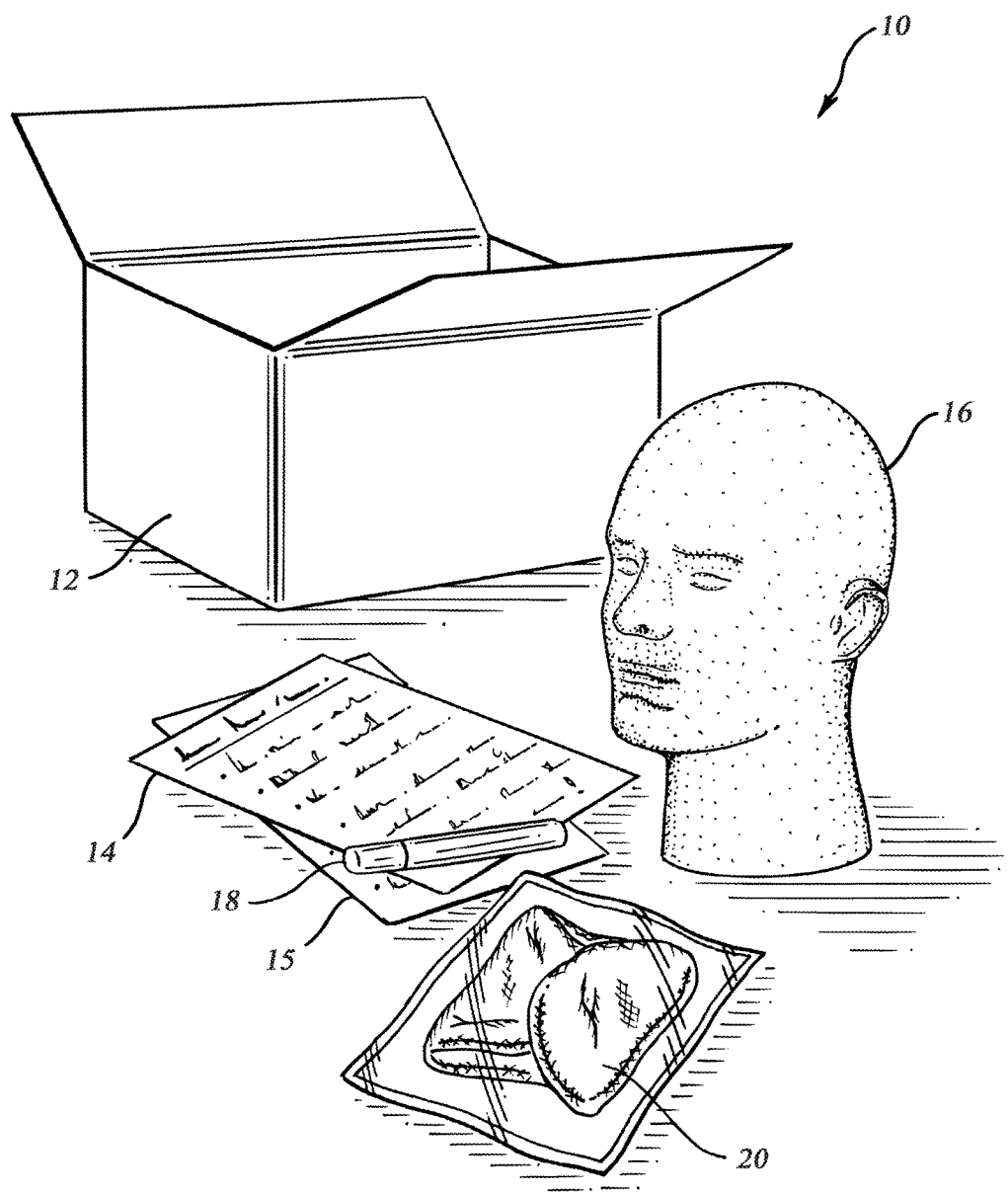
FIG. 1 is a perspective view of the various elements included in the mask kit of the present invention.

Referring now to FIGS. 1-6, wherein a preferred embodiment is shown, in which like numerals represent like elements throughout the several views. The Superhero mask kit 10 of the present invention is shown in FIG. 1. As shown, all of the elements of the mask kit 10 have been taken out of the box 12. Although other elements may be included, the mask kit 10 depicted is provided with an instruction sheet 14 along with origin sheet 15, both which will be described in greater detail below.

Figure 2:
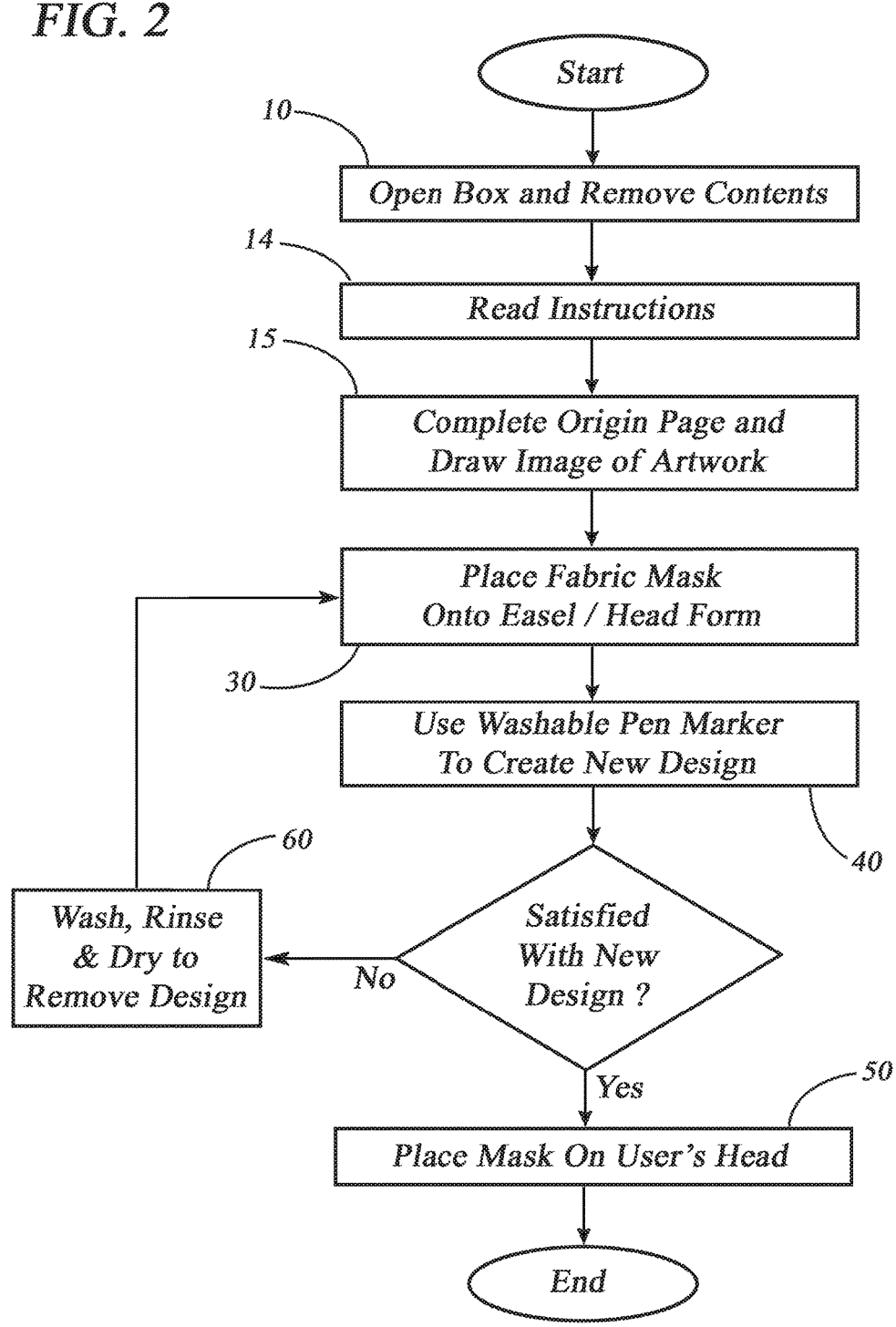
FIG. 2 is a schematic view of the steps that are involved in the method of making a mask having a character's face thereon with the mask kit of this invention and reusing the blank mask.

FIG. 2 outlines the various steps involved to create an original design on a mask 20 for the user's enjoyment and playtime.

Figure 4:
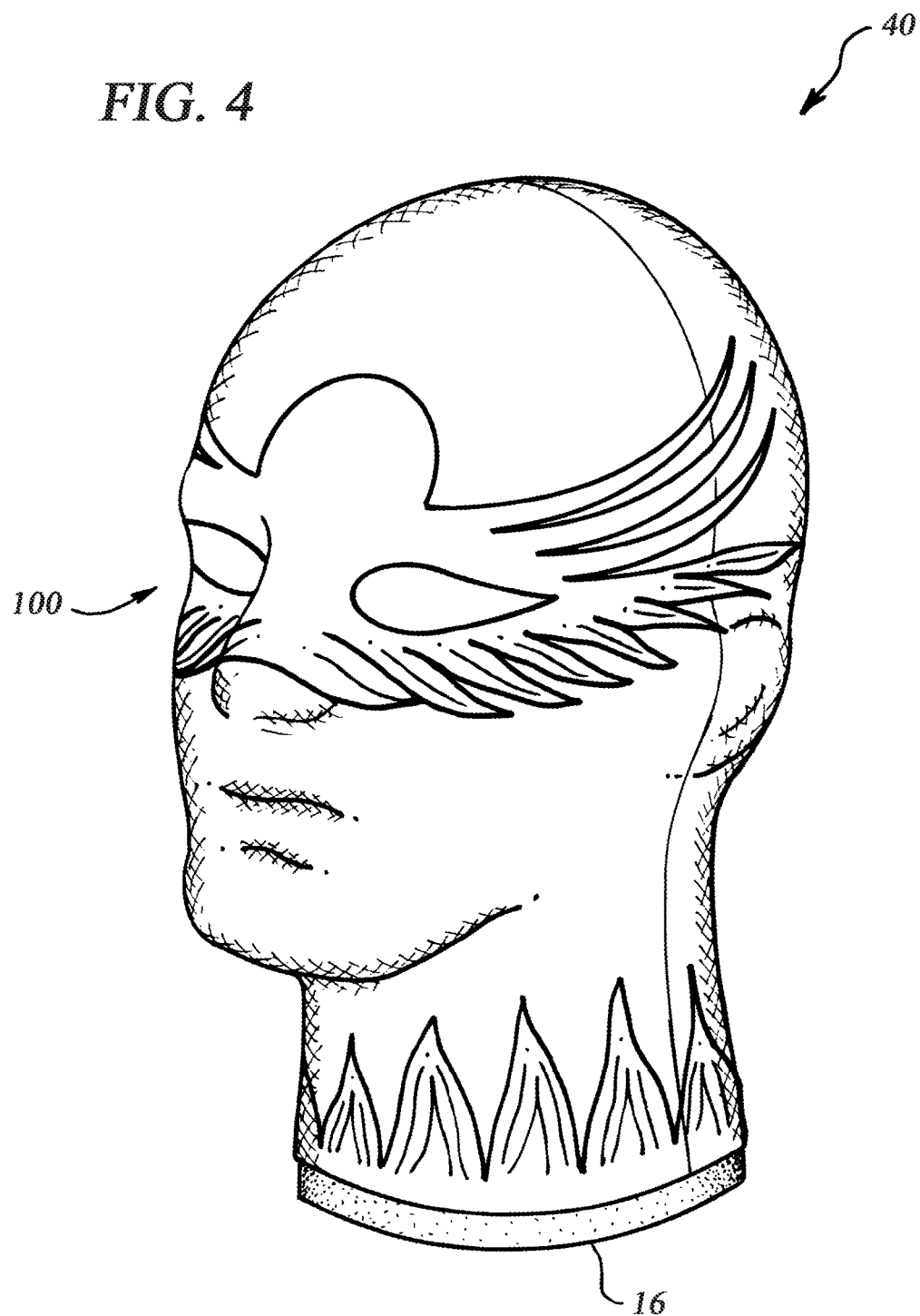
FIG. 4 is a perspective view of a mask overlaying the mannequin head-form with one example of artwork that the user might create to create the mask having a character's face thereon.
Figure 5:
FIG. 5 is a perspective view of a user in costume utilizing the mask having a character's face thereon created from the kit of this invention.

The kit 10 is used for creating a mask 20 having a character's face thereon, see FIGS. 4 and 5. The mask 20 can be worn on a head of a user 70. The kit 10 includes at least one substantially blank mask 20, although there may be a plurality of masks 20, optionally of differing colors, for creating differing character masks or for playing with a number of users. The mask 20 is made of a continuous, stretchable and elastically resilient washable see-through mesh fabric. The size of the mask 20 is such that it conforms to the user's head when worn. Such size can be adjusted to the size of the user 70, in that if the kit 10 is directed to adults the mask 10 will be of a larger size than for children.

The mesh of which the mask 10 is made is such that it easily passes air therethrough for easy breathing by the user 70 and can be seen through by the user 70. The mask 20 is made of a fabric that can easily stretch and resiliently returns to its original shape, e.g., the material provides elasticity and is form-fitting. Fabric mask 20 has a high stretch capability to allow for form fitting most any shape of head along with allowing for visibility. The fabric may be a net or like material which is cool, comfortable and washable and thru which there may be a flow of air. Typical pantyhose material, e.g., 4-way stretch polyester/Spandex® mesh, nylon, is adequate, although other materials may be used. Preferably the mask 20 material is opaque to prevent the user's features from being seen and to accent the character drawn thereon.

The kit 10 further includes a mannequin head-form 16 in the shape of a human head. The blank mask 20 is mountable tightly upon the head-form 16 and may be selectively removable therefrom, for example, after a character face is drawn on the mask 20. The mannequin head-form 16 consists of a three-dimensional model of a human face. The head-form 16 may be made of vacuum-molded plastic, such as styrene, which supports the mask 16. The mannequin head-form may be provided with a smooth but relatively hard facial surface to permit drawing on the mask 20. The mannequin head-form 16 may also be formed from soft plastic material such as urethane, polyvinyl chloride and similar plastics which are characteristically porous. Optionally, the mannequin head-form 16 can have a holder or stand (not shown) so that it may be maintained or clamped in one position while the character face is being drawn on the mask 20.

Figure 3:
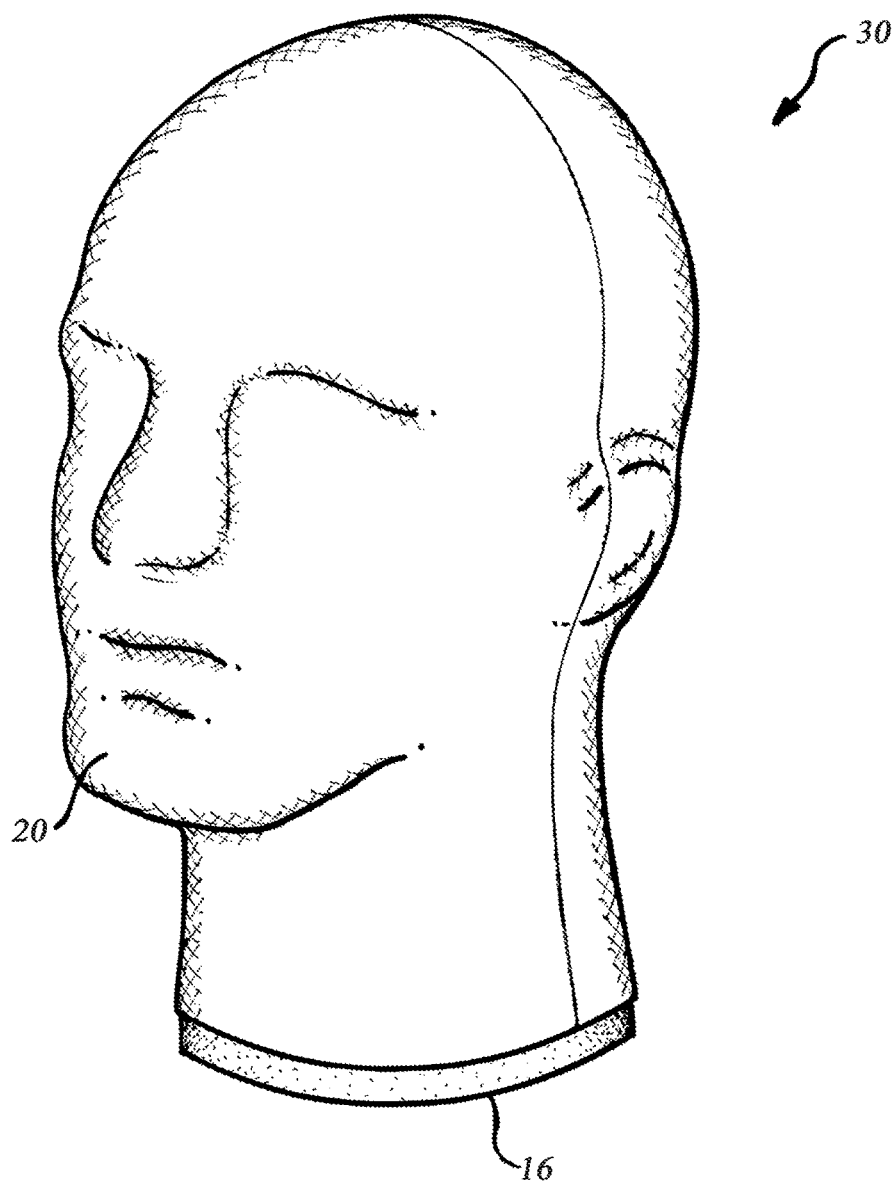
FIG. 3 is a perspective view of a mannequin head-form that may be used in the method of this invention for making a mask having a character's face thereon from the mask kit of this invention.

FIG. 3 shows step 30 whereby the blank fabric mask 20 is placed over the mannequin head-form 16 in preparation of drawing the user's 70 desired design The mask kit 10 further includes at least one marker 18 for applying removable ink indicia to such blank mask 20. Preferably there is a plurality of markers 18 of different colors may be utilized to provide various enhancements. Each marker 18 includes an ink that can be applied to the mask 20 and is water soluble so that it can be removed from the mask 20 when the mask 20 is washed.

After the mask 20 is placed on the mannequin head-form 16, one or more of the markers 18 are used to draw on the mask 20 a characters face, e.g., see FIG. 4. After the character's face is drawn on the mask 20 to the satisfaction of the user, the mask 20 is removed from the head-form 16 and placed on the head of the user 70 for use.

After use, the mask 20 is removed from the user's 70 head and washed in warm water, which may or may not have soap, to remove the ink indicia forming the character's face. This creates a substantially blank mask 20 for use in repeating the process again, i.e., mounting the blank mask 20 on the head-form 16, drawing a character's face on the blank mask 20, removing the mask 20 from the head-form 16, placing the mask 20 with the character's face thereon on the head of the user 70, removing the mask 20 from the head of the user 70, and finally, washing the mask 20 with water to again form a substantially blank mask 20 for reuse.

These steps are schematically shown in FIG. 2.

The kit 10 should also include instructions 14 describing the method of using the kit 10, and should also include any warnings and disclaimers. Origin sheet 15 is a worksheet that helps the user describe their ideas in order to create a unique character. The origin sheet 15 encourages the user to process his/her ideas using questions such as creating a name, what kind of powers and what is their history along with space to draw a sketch of the proposed design.

FIG. 4 reveals a completed mask with artwork 100 which is positioned on mannequin head-form 16. This step is shown generally as 40.

FIG. 5 shows the user 70 at play while wearing newly created mask 100. User 70 may optionally accessorize their clothing to further enhance the character they have imagined while designing their persona.

Figure 6:
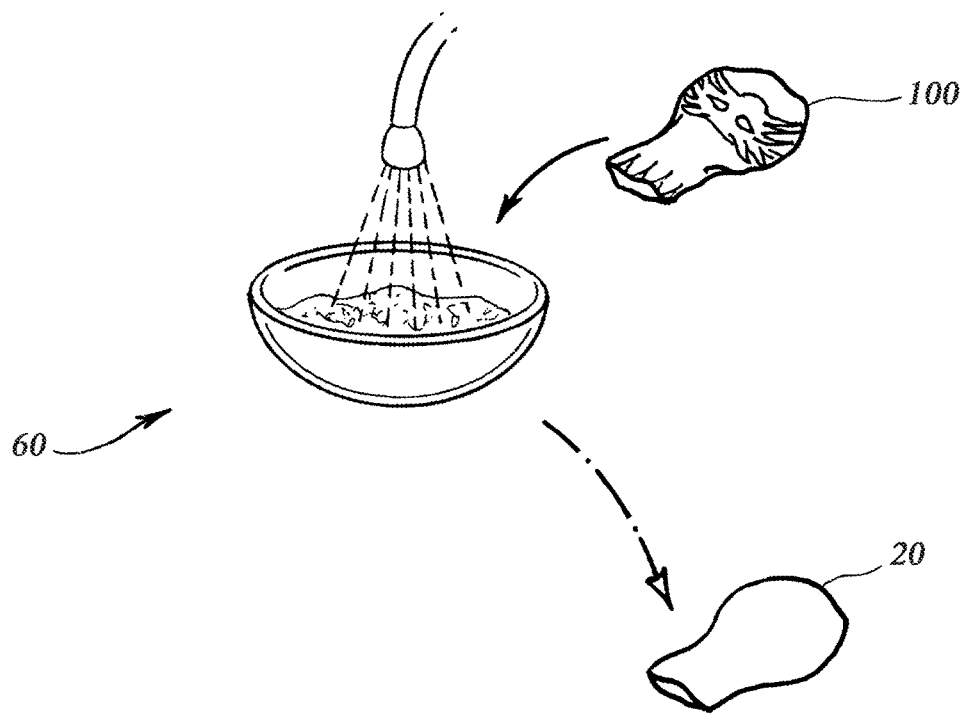
FIG. 6 is a schematic drawing showing the washing of the mask having a character's face thereon to remove the art work to create a blank mask for reuse to create another mask having another character's face thereon.

FIG. 6 shows step 60 whereby the artwork adorned mask 100 can be washed, rinsed and dried for future use as a blank slate fabric mask 20.

The invention has been described with reference to various specific and illustrative aspects of the present invention and techniques. However, it should be understood that many variations and modifications may be made while remaining within the spirit and scope of the invention. Many alternatives, modifications and variations will be apparent to those skilled in the art in light of the foregoing description. Accordingly, this invention is intended to embrace all such alternatives, modifications, and variations that fall within the spirit and scope of the appended claims.

What is claimed:

1. A method of creating a mask having a character's face thereon that can be worn on a head of a user, comprising:
   providing a substantially blank mask that is a continuous elastically stretchable, see-through, mesh net, washable fabric capable of conforming to the head of the user when worn by the user;
   b. providing a mannequin head-form in the shape of a human head, wherein the blank mask is sufficiently elastically stretchable to be mountable tightly and form fitting upon the head-form and selectively removable therefrom to return to its original shape;
   c. providing at least one marker for applying a removable ink indicia to such blank mask which can be removed from the mask by dissolution in water;
   d. mounting the blank mask on the head-form to provide a head-form having the blank mask tightly thereon;
   e. drawing a character's face on such blank mask with the at least one marker;
   f. removing the mask with the character's face thereon from the head-form;
   g. placing the mask with the character's face thereon on the head of the user for use, and;
   h. after such use, removing the mask with the character's face thereon from the head of the user;
   i. washing the mask with the character's face thereon with water to remove the ink indicia forming the character's face to form the substantially blank mask;
   j. after such washing, repeating the steps d-i.

2. The method of claim 1, wherein the mesh net fabric includes polyester.

3. The method of claim 1, wherein there are a plurality of markers of different colors.

4. A mask kit for creating a mask having a character's face thereon that can be worn on a head of a user, the kit comprising:
   a substantially blank mask that is a continuous elastically stretchable, see-through, mesh net, washable fabric capable of conforming to the head of the user when worn by the user;
   b. a mannequin head-form in the shape of a human head, wherein the blank mask is sufficiently elastically stretchable to be mountable tightly and form fitting upon the head-form and selectively removable therefrom to return to its original shape; and
   c. at least one marker for applying a removable ink indicia to the blank mask for drawing a character's face on the blank mask form, the ink indicia removable from the mask by dissolution in water.

5. The kit of claim 4, wherein the mesh fabric includes polyester.

6. The kit of claim 4, wherein there are a plurality of markers of different colors.

* * * * *